United States Patent [19]
Shibata et al.

[11] Patent Number: 5,299,170
[45] Date of Patent: Mar. 29, 1994

[54] APPARATUS FOR MEASURING PULSE WIDTH USING TWO-PHOTON ABSORPTION MEDIUM

[75] Inventors: Masaaki Shibata, Atsugi; Yasuo Tomita, Yokohama, both of Japan

[73] Assignee: Canon Kabushiki Kaisha, Tokyo, Japan

[21] Appl. No.: 894,292

[22] Filed: Jun. 4, 1992

[30] Foreign Application Priority Data

Jun. 7, 1991 [JP] Japan .................................. 3-163648
Jul. 19, 1991 [JP] Japan .................................. 3-204942
Oct. 8, 1991 [JP] Japan .................................. 3-289298
Jan. 24, 1992 [JP] Japan .................................. 4-034424

[51] Int. Cl.⁵ .............................................. G01B 9/02
[52] U.S. Cl. .................................. 356/345; 356/351; 359/326
[58] Field of Search ............... 356/345, 351, 121, 256; 359/326, 327, 330

[56] References Cited

U.S. PATENT DOCUMENTS 4,973,160 11/1990 Takiguchi et al. .................. 356/346
5,161,039 11/1992 Schellenberg ....................... 359/326

Primary Examiner—Samuel A. Turner
Assistant Examiner—Robert Kim
Attorney, Agent, or Firm—Fitzpatrick, Cella, Harper & Scinto

[57] ABSTRACT

A method of measuring the pulse width of a light pulse comprises the steps of causing a first light and a second light, which are both light pulse, to enter a medium having a two-photon absorption effect, detecting the first light of the first light and second light which have passed such medium, and measuring the pulse width of the first light or the second light on the basis of the result of the detection, and an apparatus for measuring the pulse width of a light pulse from a light source using this measuring method, whereby to obtain the self correlation function of light pulse of a light to be measured passing through the two-photon absorption medium for the provision of a highly precise measurement of light pulse width without any high precision phase adjustment of the light beam.

20 Claims, 8 Drawing Sheets

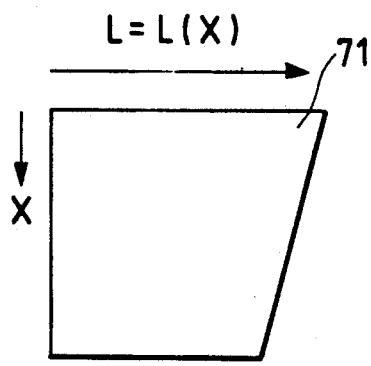
FIG. 9A
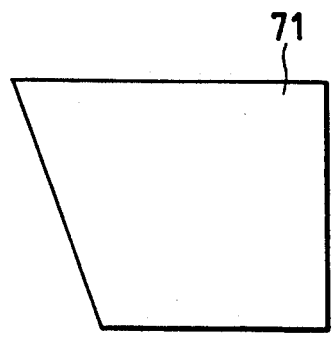
FIG. 9B
FIG. 10
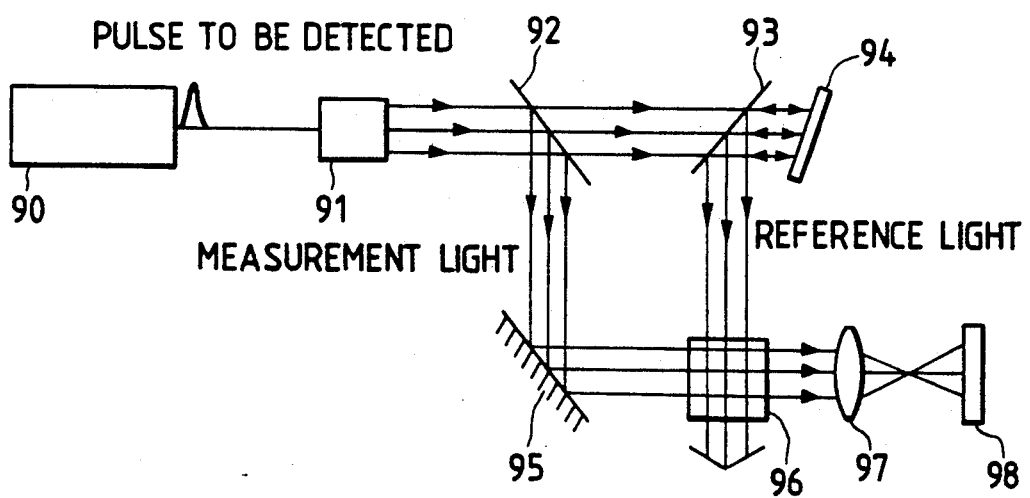

APPARATUS FOR MEASURING PULSE WIDTH USING TWO-PHOTON ABSORPTION MEDIUM

BACKGROUND OF THE INVENTION

1. Field of the Invention

The present invention relates to a light pulse measuring apparatus capable of measuring optically with a high precision an extremely short light pulse width of picosecond order of the light which is emitted from a light source means such as a laser, and a light pulse width measuring method using the apparatus.

2. Related Background Art

Traditionally, there have been proposed various optical apparatuses utilizing nonlinear optical crystal for attempting the measurement of an extremely short light pulse width of approximately picosecond of the light beam which is emitted from a light source.

FIG. 1 is a schematic view showing the principal part of a conventional light pulse width measuring apparatus using an SHG crystal (KDP) as a nonlinear optical crystal capable of producing a second harmonic generation (SHG).

In FIG. 1, a light beam having a frequency $\omega$ as light to be measured, which is emitted from a light source means 101 is divided by a beam splitter 102 into two light beams, reflection light LR and transmitting light LT. Of these light beams, the transmitting light LT is reflected by a fixed mirror 104 to return to the original light path. Also, the reflection light LR is reflected by a movable mirror 103 in the direction of the optical axis with a varied length of optical path as compared with the transmitting light LT (with a relative time difference $\tau$ provided) to return to the original light path. Then, the reflected light and transmitting light are mixed by the beam splitter 102. At this juncture, the mirror 103 is shifted for a predetermined amount to give a known relative time difference to the transmitting light and the reflection light.

In this way, the two light beams enter the nonlinear optical crystal (SHG crystal) 105 which can produce a second harmonic generation (SHG) such as KDP.

A relative positional relation between the polarization orientation of the two light beams and the crystal axis of the SHG crystal is arranged to satisfy the phase matching condition required to product the SHG, thereby to enable the highly efficient second harmonic generation (SHG) of frequency $2\omega$. Then, the light beam of frequency $\omega$ is cut by an $\omega$ cut filter 106 to allow only the light beam of the $2\omega$ frequency to be transmitted for the detection by a photodetector 107. The generation efficiency of the SHG of the $2\omega$ frequency (second harmonic generation) from the SHG crystal 105 becomes dependent on a correlation function concerning the time of the two light beams LT and LR.

Then, one of the mirrors 103 is sequentially shifted in the direction of the optical axis to vary the length of its optical path from zero to a value corresponding to one pulse or more, and the luminous intensity of the SHG is then measured by the photodetector 107 to obtain the autocorrelation function of light pulse of the light to be measured. Thus, by using arithmetic means, the pulse shape of the light to be measured is obtained thereby to secure the light pulse width of the light to be measured.

In the light pulse width measuring apparatus shown in FIG. 1 utilizing an SHG crystal, it is necessary to establish each element so that the light beam can satisfy the phase matching condition when the light beam emitted from a light source means enters the SHG crystal. Consequently, it is extremely difficult to assemble and adjust each of the elements with desired accuracy.

There is also a problem that the SHG crystal must be cut out with a high precision in a desired crystal orientation in order to obtain an SHG crystal having a desirable accuracy. Hence an extremely difficult manufacturing is required.

SUMMARY OF THE INVENTION

It is a first object of the present invention to provide a light pulse width measuring apparatus capable of measuring with ease and a high precision the light pulse width of a light to be measured without any high precision phase matching of light beam and a light pulse measuring method using the apparatus.

The above-mentioned and other objects, features and advantages of the present invention will become more apparent by reference to the detailed description of the invention set forth below.

BRIEF DESCRIPTION OF THE DRAWINGS

FIG. 9A and 9B are schematic views of the principle part showing the shape of a two-photon absorption medium according to a light pulse width measuring method of the present invention.

FIG. 10 is a view schematically showing the principal part of the embodiment 5 of a light pulse width measuring apparatus according to the present invention.

DETAILED DESCRIPTION OF THE PREFERRED EMBODIMENT

Figure 1:
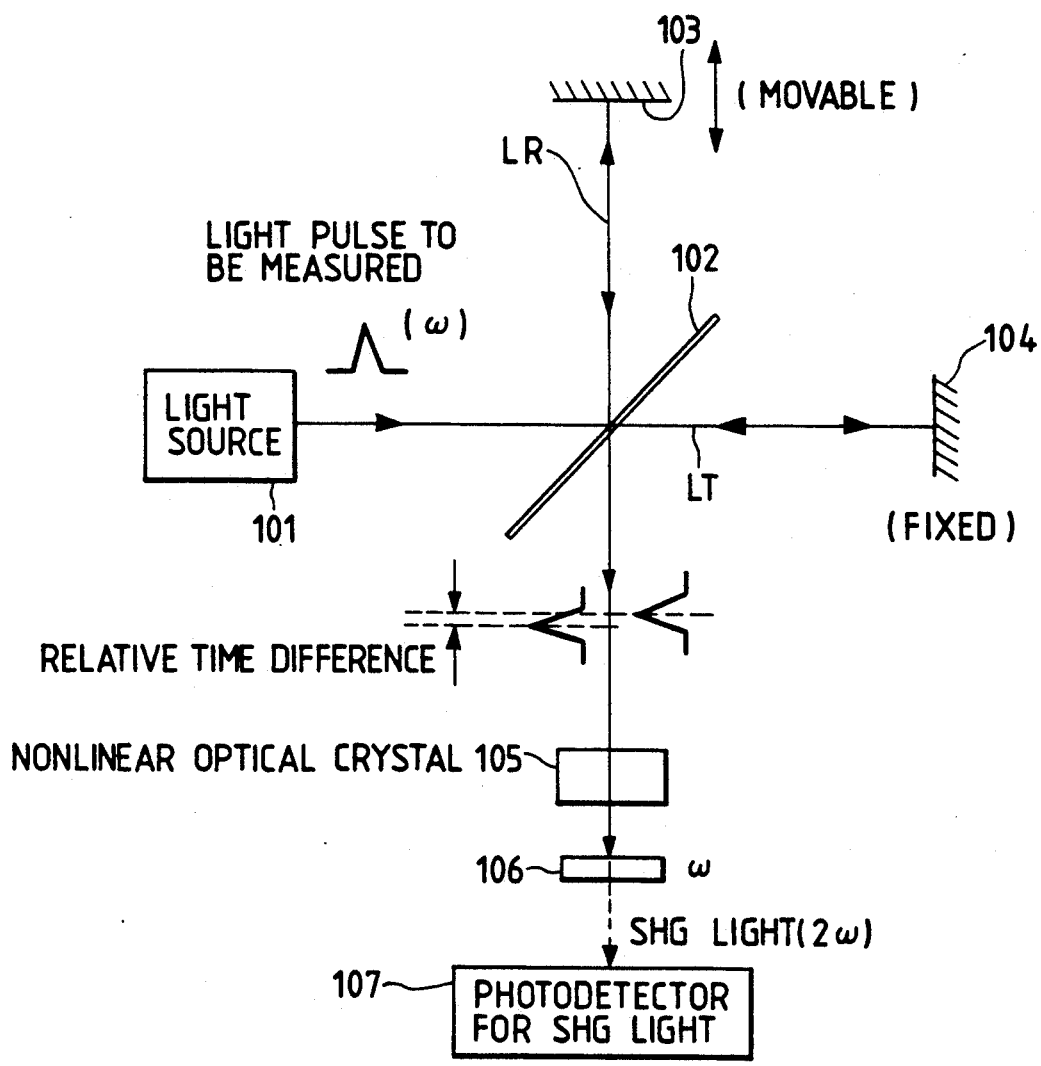
FIG. 1 is a view schematically showing the principal part of a convention light pulse width measuring apparatus.

A light pulse width measuring apparatus set forth below is characterized by the following:

(1) The two light beams, i.e., reference light and measurement light, are allowed to enter a medium having a two-photon absorption effect (TPA effect), and at least the measurement light of the two light beams through the medium is detected by a photodetector. Then, utilizing the signals from the photodetector, the light pulse width of the light beam is measured. Particularly, it is a feature of the apparatus that the luminous intensity of the measurement light is made weaker than the luminous intensity of the reference light.

(2) The light beam emitted from a light source means is divided by a light splitter into two light beams, and the two light beams are provided with different optical functions on the optical paths which are different from each other. Then, these beams are mixed by the light splitter to enter a medium having a two-photon absorption effect as two beams with the intensities different from each other. Thus, at least one of the two light beams through the medium is detected by a photodetector to measure the light pulse width of the light beam using the signals thus obtainable from the photodetector.

(3) The light beam emitted from a light source means is divided by a light splitter into two light beams, and a time difference is given between the two light beams by causing the two light beams to travel the optical paths which differ from each other. Then, these light beams are mixed by the light splitter to enter a medium having a two-photon absorption effect as two beams with intensities different from each other. Thus, at least one of the two light beams emitted from the medium, which has a weaker intensity, is detected by a photodetector after the time difference having been changed timewise or spatially in many ways thereby to measure the light pulse width of the light beam using the signals obtainable from the photodetector.

In addition, a light pulse width measuring method set forth below is characterized by the following:

(4) The light beam emitted from a light source means is divided by a light splitter into two light beams, and the two light beams are guided into the light paths different from each other. Then, the length of light path for one of these two beams is varied and a time difference is given to such one beam as compared with the other, and these are mixed by the light splitter to enter a medium having a two-photon absorption effect as two light beams with intensities different from each other. Thus, while the time difference is being changed timewise or spatially in many ways, the luminous intensity of at least one of the two light beams through the medium, which has a weaker intensity, is detected by a photodetector thereby to measure the light pulse width of the light beam using the signal obtainable from the photodetector.

Furthermore, a light pulse width measuring apparatus set forth below is characterized by the following:

(5) The two light beams, i.e., reference light and measurement light, are caused to enter a medium with its light transmittance being changeable in accordance with light intensities, and at least the measurement light of the two light beams through the medium is detected by a photodetector while the time difference for the two light beams to arrive at the medium is being changed timewise or spatially. Thus, utilizing the signals from the detector, the light pulse width of the light beam is measured.

(6) The light beam emitted from a light source means is divided by a light splitter into two light beams, and these two light beams are guided to the light paths which are different from each other. Then, the wave front of light pulse of at least one of the light beams is inclined. Subsequently, these are caused to enter from different directions a medium having two-photon absorption effect as two light beams with intensities different from each other, and the spatial distribution of the light intensity of at least one of the two light beams transmitted through said medium, which has a weaker intensity, is detected by a photodetector. Hence detecting the light pulse width of the light beam using the signals obtained by the photodetector.

Besides, it is a feature of the apparatus that the incident plane and transmitting plane of the light beam of a weaker intensity are not parallel with respect to the medium having the two-photon absorption effect.

Figure 2A:
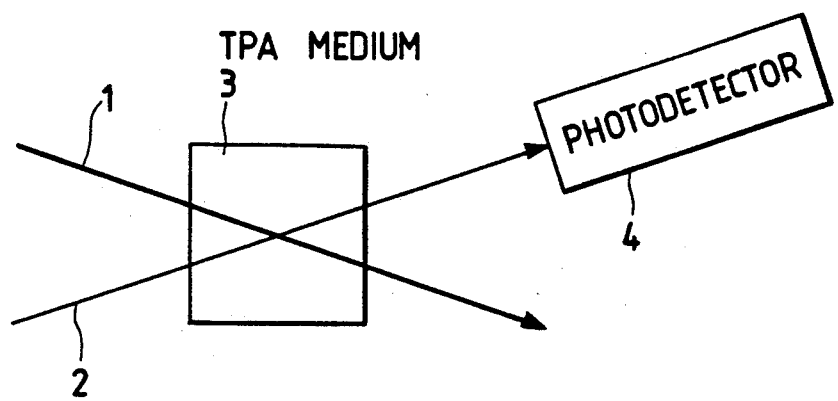
FIG. 2A is a schematic view of the principal part illustrating the principle of a method of measuring a light pulse width according to the present invention.

FIG. 2A is a schematic view of a principal part showing the principle when the light pulse width is measured according to the present invention. In FIG. 2A, a reference numeral 1 designates a pump light beam as a reference light and 2, a probe light as a measurement light. Both light beams 1 and 2 are those separated from a light beam emitted from a same light source means. Of these light beams, the pump light beam 1 is allowed to have a larger pulse energy (luminous intensity) than the probe light beam 2. There is also provided a predetermined time difference between both of the light beams 1 and 2.

A reference numeral 3 designates a medium having a two-photon absorption effect (TPA effect) (hereinafter referred to as TPA medium). It is formed with a nonlinear optical crystal of GaAs or the like, for example. The photon energy adopted for the pump light beam and probe light beam is smaller than the band gap of the TPA medium 3 so that the linear light absorption by the TPA medium 3 becomes small. A reference numeral 4 designates a photodetector to detect the luminous intensity (light transmittance) of the probe light beam 2 of the two light beams which have passed the TPA medium 3.

In the present embodiment, if there is a predetermined time delay (time difference $\tau$) in the probe light beam 2 with respect to the pump light beam 1, the TPA medium 3 effectuates a light absorption against the probe light beam 2 for an amount corresponding to the time difference when it passes the TPA medium 3. As a result, the luminous intensity (transmittance) of the probe light beam 2 varies in accordance with the time difference $\tau$ when it passes the TPA medium 3.

Figure 2B:
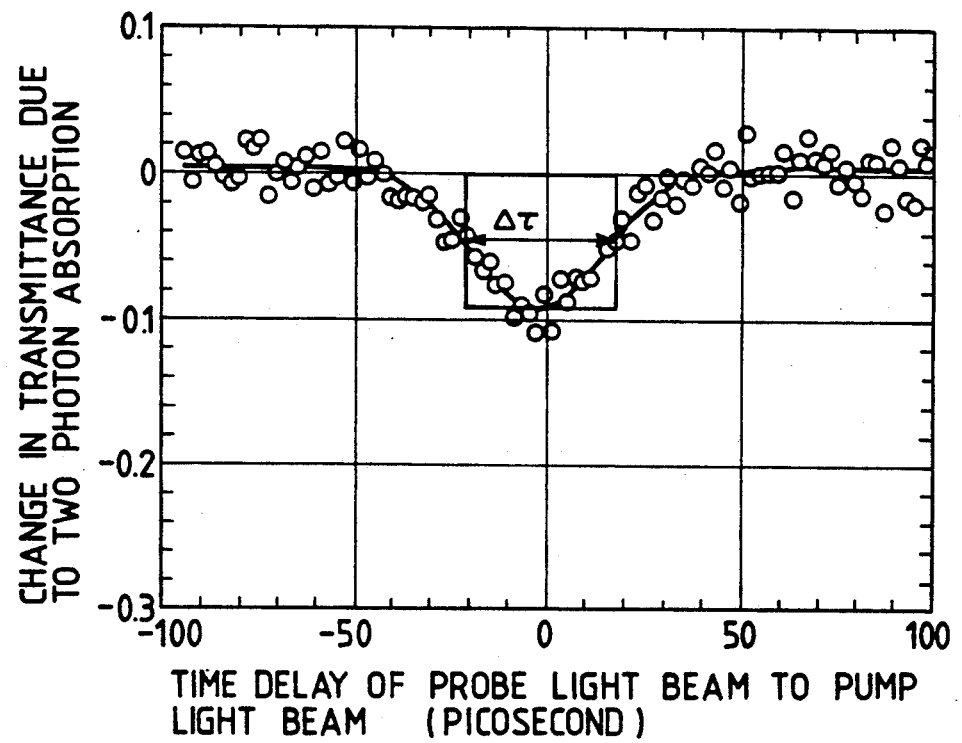
FIG. 2B is a view illustrating the time difference between two light beams and changes in the transmittance due to a two-photon absorption according to the present invention.

The photodetector 4 detects the luminous energy of the probe light beam 2 when the time difference for the probe light beam 2 is changed variously with respect to the pump light beam 1. In other words, it detects the autocorrelation of the probe light beam 2. Then, as shown in FIG. 2B which will be described later, the light pulse width of the probe light beam (pump light beam) is obtained by calculation on the basis of the relationship between the changes in the luminous intensity (transmittance) of the probe light beam 2 obtained by the photodetector 4 at that time and the time difference between the two light beams.

Subsequently, the description will be made of a method of measuring the light pulse width according to the present invention using numerical formulas. The light absorption that the probe light beam 2 receives in the direction of propagation (z axis direction) in the TPA medium 3 can be expressed by the following differential equation:

$$\frac{dI_1(r,z;t)}{dz} = -\{\alpha + [\beta_{11}I_1(r,z;t) + \beta_{12}I_2(r,z;t+\tau)]\} I_1(r,z;t) \quad (1a)$$

$$\frac{dI_2(r,z;t)}{dz} = -\{\alpha + [\beta_{12}I_1(r,z;t-\tau) + \beta_{22}I_2(r,z;t)]\} I_2(r,z;t) \quad (1b)$$

Where $\alpha$ is a linear absorption coefficient; $\beta_{11}$, $\beta_{12}$, and $\beta_{22}$ are two-photon absorption coefficient; I is a luminous intensity at a propagation distance z from the surface of the TPA medium 3 and same radial distance r, and subscriptions 1 and 2 represent the pump light beam and probe light beam, respectively; and $\tau$ is the time delay (time difference) of the pump light beam 1 with respect to the probe light beam 2. In this respect, the pulse energy of the two light beams 1 and 2 is not very large, and it is assumed that the light absorption of the two light beams due to free carriers generated by the two-photon absorption is negligible. In this case, while it is assumed that $I_1 > I_2$ and that any attenuation is negligible, the following solution can be obtained when the condition $\beta_{11} = \beta_{12} \equiv \beta$ is considered:

$$I_2^{out}(r,z;t) \approx (1-R)^2 I_{20}(r,o;t) e^{-[\alpha+\beta(1-R)I_{10}(-r,o;t-\tau)]z} \quad (2)$$

Where $I_{10}(r,o;t)$ and $I_{20}(r,o;t)$ are the intensity of the two light beams which enter the TPA medium and R is the Fresnel reflectivity on the surface of the TPA medium, and while the multi reflection in the TPA medium is being neglected, the luminous intensity of the probe light beam 2 immediately after being transmitted through the TPA medium is assumed to be:

$$I_w^{out}(r,z;t) = (1-R)I_2(r,z;t)$$

Further, if the attenuation due to the two-photon absorption is small, the expression (2) can be approximated as follows:

$$I_2^{out}(r,z;t) \approx (1-R)^2 I_{20}(r,o;t) e^{-\alpha z} \{1 - \beta(1-R)I_{10}(-r,o;t-\tau)z\} \quad (3)$$

From the above expression, the variation of the transmission luminous intensity of the two-photon absorption can be expressed as follows provided that the pulse shapes of the two light beams are the same but only the relative intensity is different and that the condition is given as $I_{20} = \gamma I_{10}$:

$$\Delta I = I_2^{out}(r,z;t) - (1-R)^2 I_{20}(r,o;t)$$
$$- \gamma \beta (1-R)^3 I_{20}(r,o;t) I_{20}(r,o;t+\tau) z$$

In a case of the light pulse of picosecond order, the actual value of the detection becomes its time integral value. Therefore, it can be expressed as follows in terms of one single light pulse:

$$E(\tau) = \int_{-\infty}^{\infty} |\Delta I| dt = \gamma \beta (1-R)^3$$
$$\int_{-\infty}^{\infty} I_{20}(r,o;t) I_{20}(r,o;t-\tau) dt$$

This is proportional to the auto correlation function of the pulse of the incident light beam. For example, assuming that the incident pulse waveform is of a Gaussian distribution and that for convenience sake, the pulse width is defined to be full width at half maximum (FWHM), the following relationship is present between the full width at half maximum (FWHM) of the pulse of the incident light beam $t_p$ and the full width at half maximum (FWHM) of its correlation value $\Delta\tau$:

$$\frac{\Delta\tau}{t_p} = \sqrt{2} \quad (4)$$

Therefore, it is possible to work out the pulse width $t_p$ by measuring the full width at half maximum width $\Delta\tau$ of the correlation value with the medium having the two-photon absorption effect according to the present invention. Thus the presumption of a pulse width by a autocorrelation enables its autocorrelation function to be known in advance by assuming a specific function type (sech$^2$ pulse, for example) even with the pulse type of a distribution other than the Gaussian distribution (this is the same in the conventional SHG method). It is therefore possible to estimate the pulse width likewise according to the present invention as described above.

FIG. 2B is a view showing an example of a measurement of the two-photon absorption by the light pulse of the Gaussian shape of the full width at half maximum $t_p = 28.7$ picoseconds (measurement value by a streak camera) of a Nd : YAG laser (wavelength 1.06 $\mu$m) using GaAs with a value obtainable from the photodetector 4 with respect to the relative time difference $\tau$ between the two light beams as transmittance change.

In the present embodiment, the intensity ratio of the two light beams is pump light beam : probe light beam = 24 : 1. This is a condition that the two-photon absorption of the single probe light beam is sufficiently smaller than the two-photon absorption by the correlation of the two light beams. The fluence per pulse is 7 mJ/cm$^2$ and free carrier absorption is negligible. In FIG. 2B, the curved line is a fitting by Gaussian function because the correlation function is also of a Gaussian shape when the light pulse is of a Gaussian shape. In the present embodiment, the error of the fitting is approximately less than 2%.

The value $\Delta\tau$ obtained from this fitting parameter of the curved line is 35 picoseconds, and from the expression (4), the pulse width $t_p$ can be estimated as 28.8 picoseconds. The pulse width $t_p$ thus obtained from this measurement example is confirmed to be substantially equal to the measurement value of the single light pulse by the streak camera.

In this respect, while the case where GaAs is used as a medium having the two-photon absorption effect (TPA effect) is described according to the present invention, it may be possible to obtain the same effect as the aforesaid embodiment by the use of a semiconductor such as CdTe or InP or an insulator such as BaTiO$_3$, KNbO$_3$ or SBN as other media having the TPA effect.

In FIG. 2A which shows the principle, the pump light and probe light enter the TPA medium not in parallel. However, it may be possible for them to enter the TPA medium in parallel. In such a case, if each direction of the polarization of both light beams is orthogonal with each other, only the probe light beam can be detected effectively by the photodetector to improve the S/N ratio desirably.

Subsequently, the description will be made of a specific example of a light pulse width measuring method using a light pulse width measuring apparatus according to the present invention.

Figure 3:
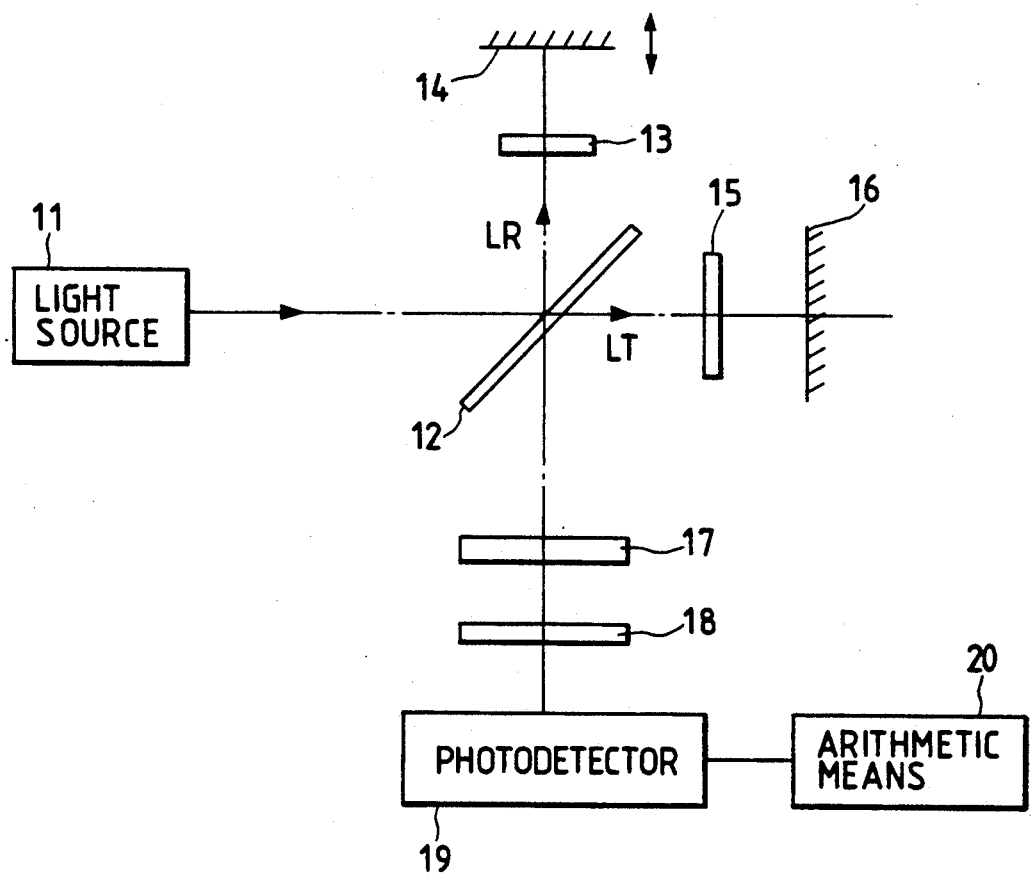
FIG. 3 is a view schematically showing the principal part of the embodiment 1 of a light pulse width measuring apparatus according to the present invention.

FIG. 3 is a view schematically showing the principal part of the embodiment 1 of a light pulse width measuring apparatus according to the present invention.

In FIG. 3, a reference numeral 11 designates a light source means having a laser light source and others, for example, to emit the pulse light which is polarized as a light to be measured, and 12, a polarization beam splitter serving as a light splitter to divide the light beam from the light source means 11 into two linearly polarized light beams of reflection light LR and transmitting light LT which are orthogonal to each other.

Of these light beams, the reflection light LR (hereinafter referred to as probe light beam) having its polarization plane in the direction perpendicular to the plane of FIG. 13, for example, becomes a circularly polarized light when passing through a λ/4 plate 13 and is reflected by a mirror 14 which is movable in the direction of the optical axis. Then, this will again become a linearly polarized light when passing through the λ/4 plate 13 to have its polarization plane in the direction parallel to the plane of FIG. 3 and pass the polarization beam splitter 12 this time.

On the other hand, the transmitting light LT passing the polarization beam splitter 12 (hereinafter referred to as pump light beam) having its polarization plane in the direction parallel to the plane of FIG. 3 becomes a circularly polarized light when passing through a λ/4 plate 15 and is reflected by a fixed mirror 16 to pass again the λ/4 plate 15. Thus it becomes the linearly polarized light having its polarization plane in the direction perpendicular to the plane of FIG. 3 and is reflected by the polarization beam splitter 12 this time. In this way, the two light beams LR and LT are mixed by the polarization beam splitter 12.

At this juncture, by changing the position of the mirror 14 in the direction of the optical axis, the probe light beam LR is delayed for a predetermined time against the pump light beam LT thereby to allow the polarization beam splitter 12 to carry out the required mixing. In other words, a relative time difference is given between the probe light beam LR and pump light beam LT.

Then, the two light beams from the polarization beam splitter 12 are caused to enter the medium (TPA medium) 17 which has a two-photon absorption effect in a paralleled state. At this juncture, an arrangement is made to allow the probe light beam LR and pump light beam LT to enter the TPA medium 17 both of them with the luminous intensities between the two light beams being different from each other.

For example, the polarization state (a shape of elliptically polarized light) of the light beam emitted from the light source means 11 is adjusted to enable it to enter the polarization beam splitter 12, or an ND filter or other optical filters arranged in the light path. Thus, making the luminous intensities of the probe light beam LR and pump light beam LT, which enter the TPA medium 17, different from each other. In this way, the TPA medium 17 can effectuate its light absorption in an amount corresponding to the time difference when the probe light beam 2 passes the TPA medium 17.

Subsequently, only the probe light beam LR having a weaker luminous intensity of the two light beams which have passes the TPA medium 17 is allowed to pass the polarization plate 18 and enter the photodetector 19. At this juncture, the movable mirror 14 is shifted in the direction of the optical axis for a distance longer than the light pulse width, for example, to change the time differences given to both of the light beams variously.

Thus, the luminous intensity of the probe light beam LR having passed the TPA medium 17, that is, the transmittance variation of the probe light beam LR in accordance with the time difference, is detected by the photodetector 19.

Then, using the signal from the photodetector 19 (that is, luminous intensity per light beam time difference), the light pulse width of the light beam emitted from the light source means 11 is calculated and obtained by the arithmetic means 20 on the basis of the formulas.

Figure 4:
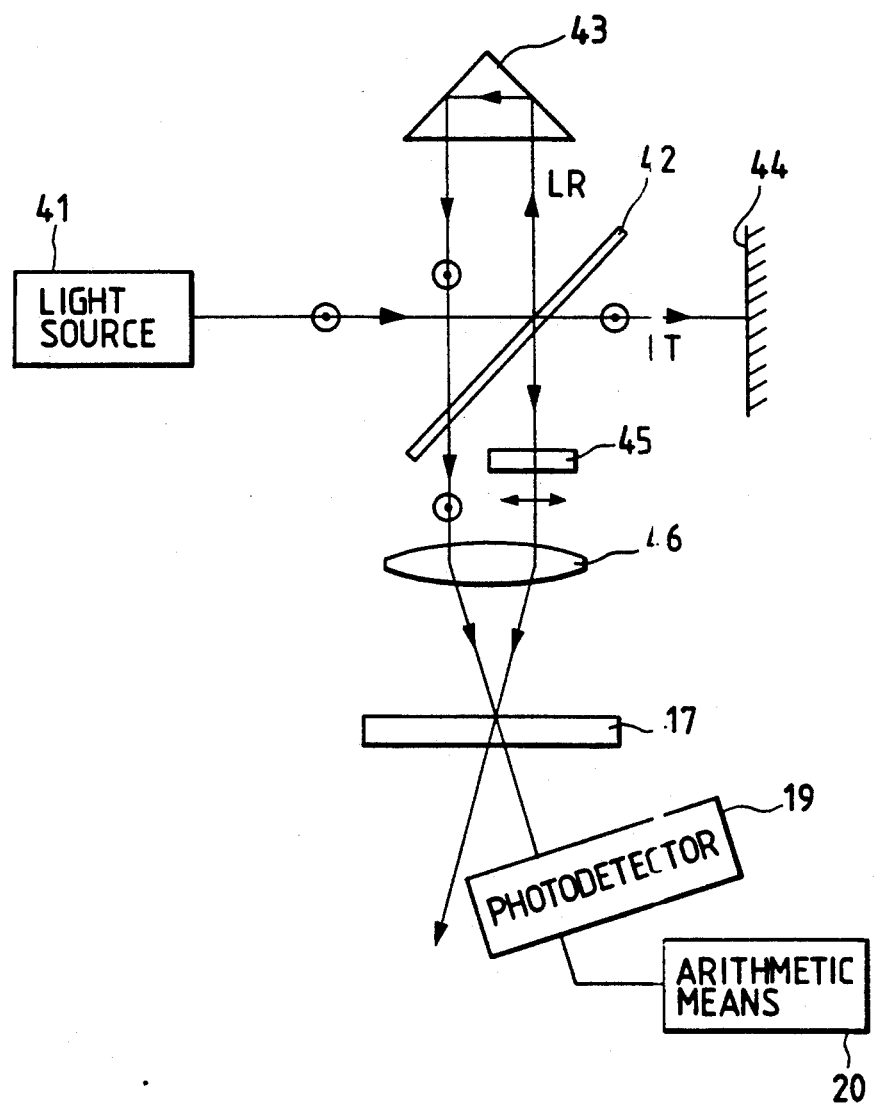
FIG. 4 is a view schematically showing the principal part of the embodiment 2 of a light pulse width measuring apparatus according to the present invention.

FIG. 4 is a view schematically showing the principal part of the embodiment 2 of a light pulse width measuring apparatus according to the present invention. In FIG. 4, the same reference numeral is given to an element which is the same as the one appearing in the embodiment 1 described in conjunction with FIG. 3.

The present embodiment differs from the embodiment 1 shown in FIG. 3 greatly in that a light to be measured, which is emitted from a light source means 41, is a linearly polarized light to have its polarization plane in the direction perpendicular to the plane of FIG. 4, for example.

In the present embodiment, the light beam of the linear polarization emitted from the light source means 41 is divided into the two light beams, reflection light LR and transmitting light LT, by a beam splitter (half mirror) 42. Of these light beams, the reflection light (probe light beam) LR is reflected by a corner cube 43 which is movable in the direction of the optical axis to enter again the beam splitter 42 in a state that the beam is shifted in parallel with the optical path.

Also, the transmitting light (pump light beam) LT is reflected by a fixed mirror 44 to enter again the beam splitter 42. In this way, a predetermined time difference is given between the two light beams LR and LT to enable the beam splitter 42 to effectuate the required mixing.

Then, by rotating the polarization plane of only pump light beam LT 90 degrees, for example, through a λ/2 plate 45, the beam is made a linearly polarized light having its polarization plane in the direction parallel to the plane of FIG. 4. Thus, the two light beams LR and LT are condensed by a condenser lens 46 to allow them to enter the TPA medium 17 in a state that they are not in parallel.

This is a measure to prevent transient energy transfer by the refractive index grating generated transiently in the TPA medium 17 when the probe light LR and pump light LT have polarization in the same direction. It is, of course, needless to mention that the light beams of a same polarization are applicable if a TPA medium to be adopted does not produce such an effect as this. In this case, for example, the ratios of the reflectivity and transmittance of the beam splitter 42 are adjusted or an ND filter or other optical filters are arranged in the optical path to enable the luminous intensities of the probe light beam LR and pump light beam LT to differ from each other, and then allow them to enter the TPA medium 17.

Thus, only the probe light beam LR which has a weaker luminous intensity of the beams having passed the TPA medium 17 is detected by the photodetector 19.

Then, by displacing the corner cube 43 on the optical axis, a time difference of one pulse or more is given between the two light beams, and using the signal which is obtained by the photodetector 19 at this time, the light pulse width of the light beam emitted from the light source means 41 is calculated and obtained by the arithmetic means 20 as in the case of the embodiment 1.

In this respect, it may be possible to arrange a λ/4 plate between the beam splitter 42 and mirror 44 instead of the λ/2 plate 45 in the present embodiment thereby to allow the polarization plane of the pump light beam LT to be rotated 90 degrees.

Figure 5:
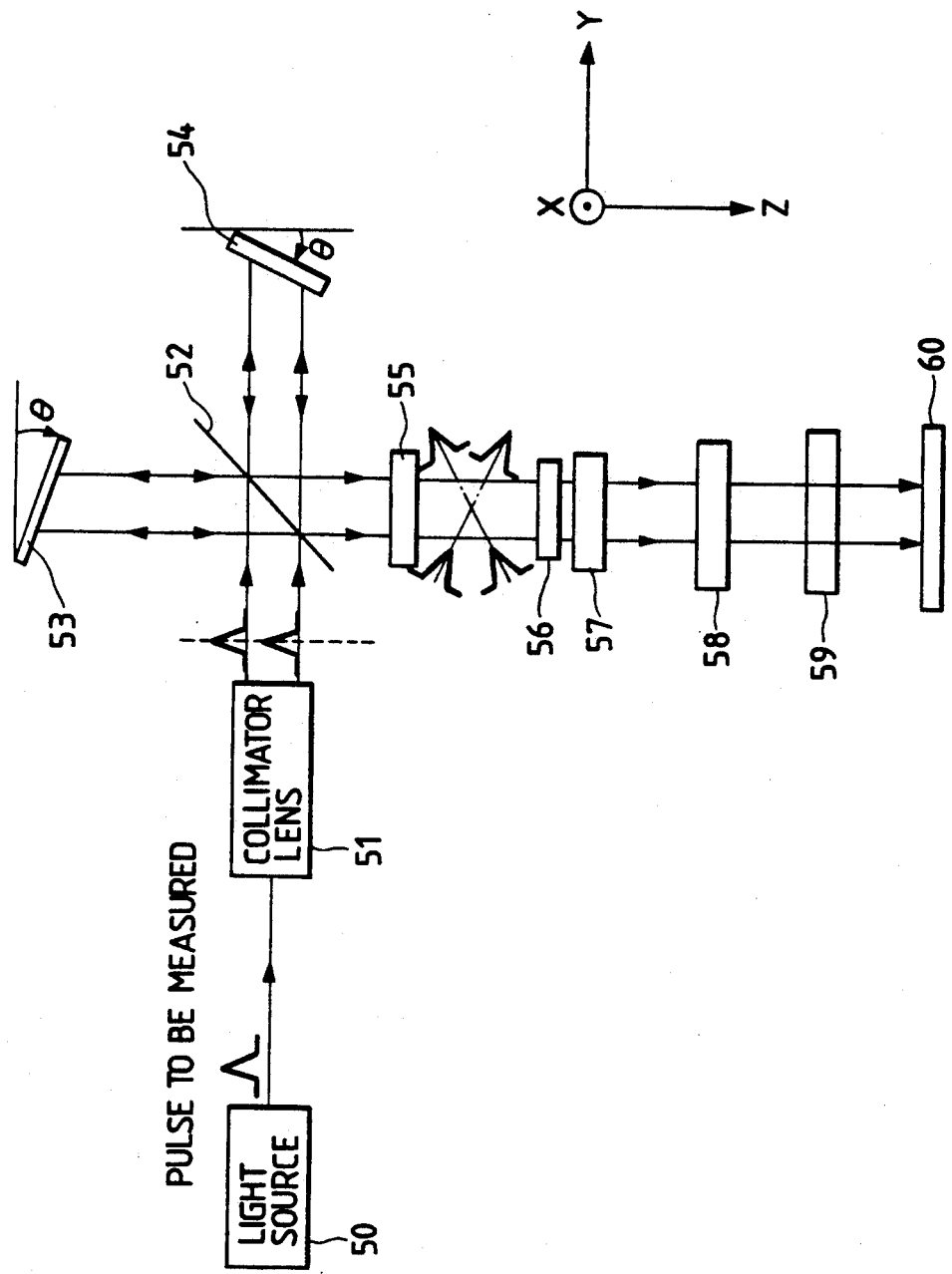
FIG. 5 is a view schematically showing the principal part of the embodiment 3 of a light pulse width measuring apparatus according to the present invention.

FIG. 5 is a view schematically showing the principal part of the embodiment 3 according to the present invention. When the value of a autocorrelation is obtained with respect to a certain time delay by the SHG of a light pulse to be measured against each length of the optical path while changing the lengths of optical path of one of the mirrors sequentially, there is a need for measurements for a number of pulses in order to obtain the total autocorrelation function (that is, the estimated pulse width). In other words, the estimated value of given pulse width is a mean value of many pulses.

Therefore, while the pulse width thus obtained can be an accurate one if the laser generating the light pulses of a light to be measured can generate exactly the same pulses sequentially, it is rare that each of the pulses generated results in the same pulse, particularly in a laser which emits pulses of a high energy.

In the present embodiment, the temporal correlation function of the light pulse width of a light to be measured is converted into a correlation function of spatial coordinate to measure the light pulse width. This is the point which differs from the embodiment 1.

In other words, according to the present embodiment, a light to be measured, which is emitted from a light source means 50, becomes a sheet beam enlarged on the plane of FIG. 5 (z direction) by a one-dimentional collimator lens 51 (in the direction x, it is the same as the incident light). At this juncture, no time delay is present in the pulses at both ends of the sheet beam. Then, this sheet beam is divided into two by a beam splitter 52.

Further, of the two sheet beams, the energy of one of the sheet beams is made sufficiently smaller than the energy of the other sheet beam. Then, each of the sheet beams is diffracted (reflected) in the same direction as its incident direction with respect to the direction z by means of the diffraction gratings 53 and 54 inclined θ to the x-y plane and x-z plane, respectively, in the y-z plane. In order to implement this, a blazed grating is used for the diffraction grating 53 and 54 to make it possible to obtain an intensified diffraction light beam in the same direction as the incident direction when observed from the direction x.

Further, the diffraction gratings 53 and 54 are slightly inclined around the y axis and z axis, respectively, in the directions opposite to each other. The sheet beams reflected from the diffraction gratings 53 and 54 are still separated in the direction x (the direction perpendicular to the plane of FIG. 5) after having entered the beam splitter 52 again. Here, the interconnecting each of the pulses at both ends of each sheet beam is inclined against the z axis when the sheet beams are reflected as shown in FIG. 5 because the diffraction gratings 53 and 54 are inclined with respect to the x-y plane and x-z plane, respectively.

As a result, both pulses of the two sheet beams are superposed at its central positions (that is, no resultant time delay), but in the direction y from the central positions, there is the relative time delay for the pulses of the two sheet beams in terms of the spatial positions. These two sheet beams are allowed to enter the optical element 55 again through the beam splitter 52. The optical element 55 (a prism, for example) serves to parallel the sheet beams from the diffraction gratings 53 and 54 in the direction x.

Then, the sheet beams thus paralleled are condensed in the direction x on the medium 58 through a one-dimensional lens 56 having its condensing function in the direction x, and the polarization direction of one of the sheet beam of the two sheet beams is rotated 90 degrees by a half wavelength plate 57 to cause it to intersect the polarization direction of the other sheet beam at right angles and enter the two-photon absorption medium (TPA medium) 58.

This is a measure to prevent transient energy transfer by the diffraction index grating transiently generated in the two-photon absorption medium 58 in a case of the same polarization direction. Of the two sheet beams being transmitted through the two-photon absorption medium 58, the sheet beam which has a smaller energy forms a linear image on the line sensor 60 with its elements being arranged in the direction y to be detected by the line sensor through a lens system 59 (a cylindrical lens, for example) which has its condensing function in the direction x but not any lens function in the direction y.

In this case, for the sheet beam to be detected, its absorption becomes maximized at the central part of the sheet beam due to the nonlinear absorption effect in the aforesaid two-photon absorption medium 58, and the absorption becomes increasingly smaller in the direction y apart therefrom. Therefore, when the energy of this sheet beam is detected by the sensor 60, the output distribution per each element of the line sensor represents the same shape as the experimental result shown in FIG. 2, that is, the shape of the correlation function of the light pulse of a light to be measured where the transmittance of the sheet beam is minimum at the center of the sheet beam.

It is therefore possible to detect the temporal correlation function of the light pulse of a light to be measured simultaneously as a function for the spatial coordinate (position in the y axis direction on the sensor as shown in FIG. 5), and using this, the light pulse width of a light to be measured is estimated in the same manner as described earlier. In the present embodiment, the light pulse width is measured as set forth above.

Figure 6:
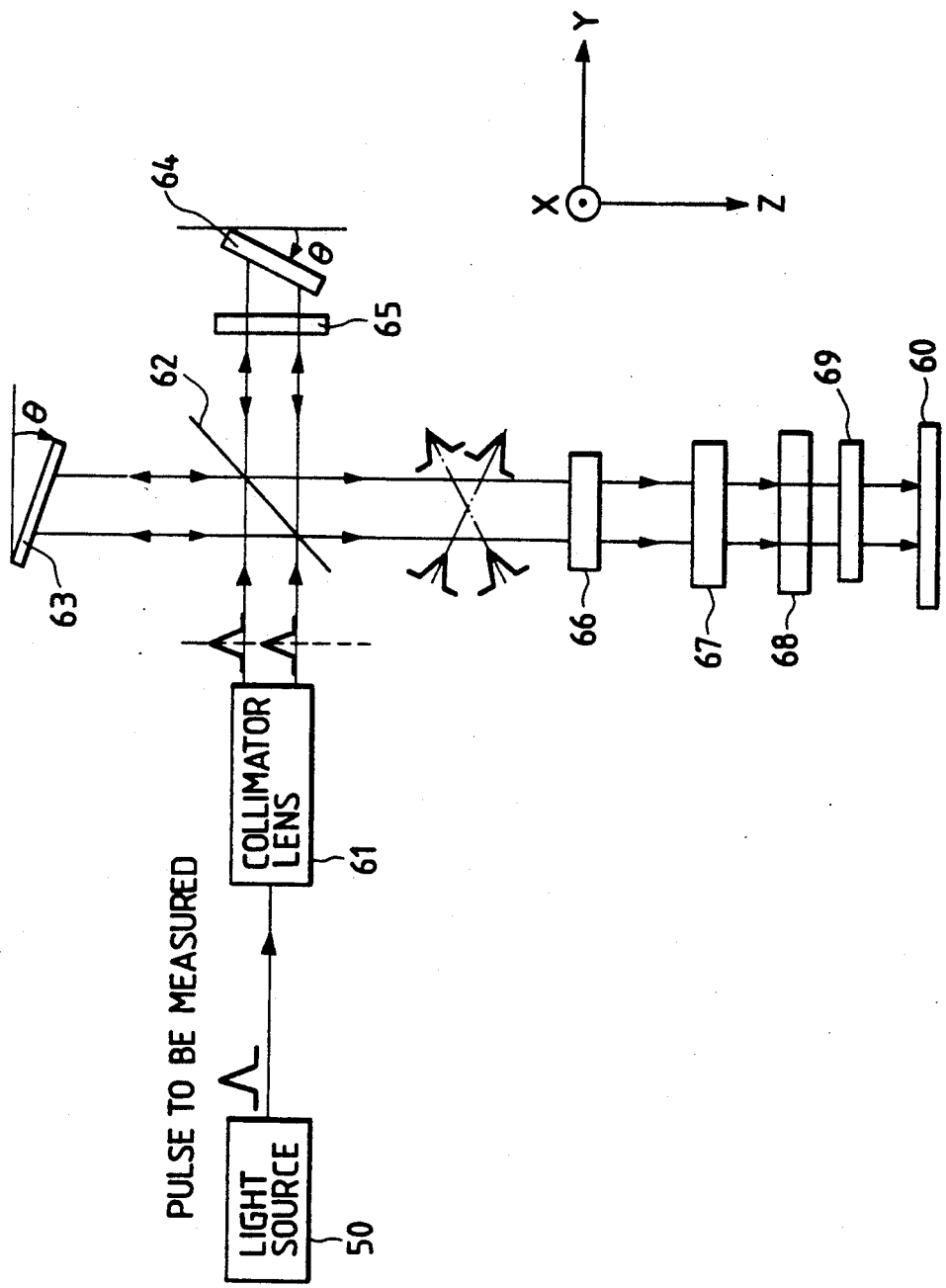
FIG. 6 is a view schematically showing the principal part of the embodiment 4 of a light pulse width measuring apparatus according to the present invention.

FIG. 6 is a view schematically showing the principal part of the embodiment 4 according to the present invention.

As compared with the embodiment 3 described in conjunction with FIG. 5, it is the same in the present embodiment that the diffraction gratings 63 and 64 are inclined only by θ to the x-y plane and x-z plane, respectively, on the y-z plane, but not inclined around the y axis and z axis, respectively. This is the point which differs therefrom. As a result, the two sheet beams reflected by the diffraction gratings 63 and 64 are not separated spatially. In this case, a ¼ wavelength plate 65 is arranged on the optical path of one of the sheet beam in order to make the polarization direction of one of the sheet beams thus reflected to be orthogonal to the polarization direction of the other sheet beam.

Furthermore, of the two sheet beams, the energy of one sheet beam is made sufficiently smaller than the energy of the other sheet beam and then condensed by a one-dimensional lens 66 in the direction x to be collected in a two-photon absorption medium 67. Of the two sheet beams passing the two-photon absorption medium 67, the sheet beam which has a smaller energy forms a linear image on the line sensor 60 with its elements arranged in the direction y by being selectively transmitted by a polarization element 69 through a lens system 68 which has its condensing function only in the direction x.

At this juncture, by the nonlinear absorption effect in the two-photon absorption medium 67, the absorption in the sheet beam in its central part becomes maximized, and the absorption becomes increasingly smaller as it is deviated in the direction y therefrom. As a result, the output of a shape of the correlation function of the light pulse of a light to be measured, where the transmittance of the sheet beam becomes minimum in the center of the sheet beam as in the case of the embodiment shown in FIG. 5, is detected as the output distribution of the line sensor. In this way, it is possible to detect simultaneously the temporal correlation function of the light pulse of a light to be measured as a function for a spatial coordinate thereby to estimate the light pulse width of a light to be measured.

Figure 7:
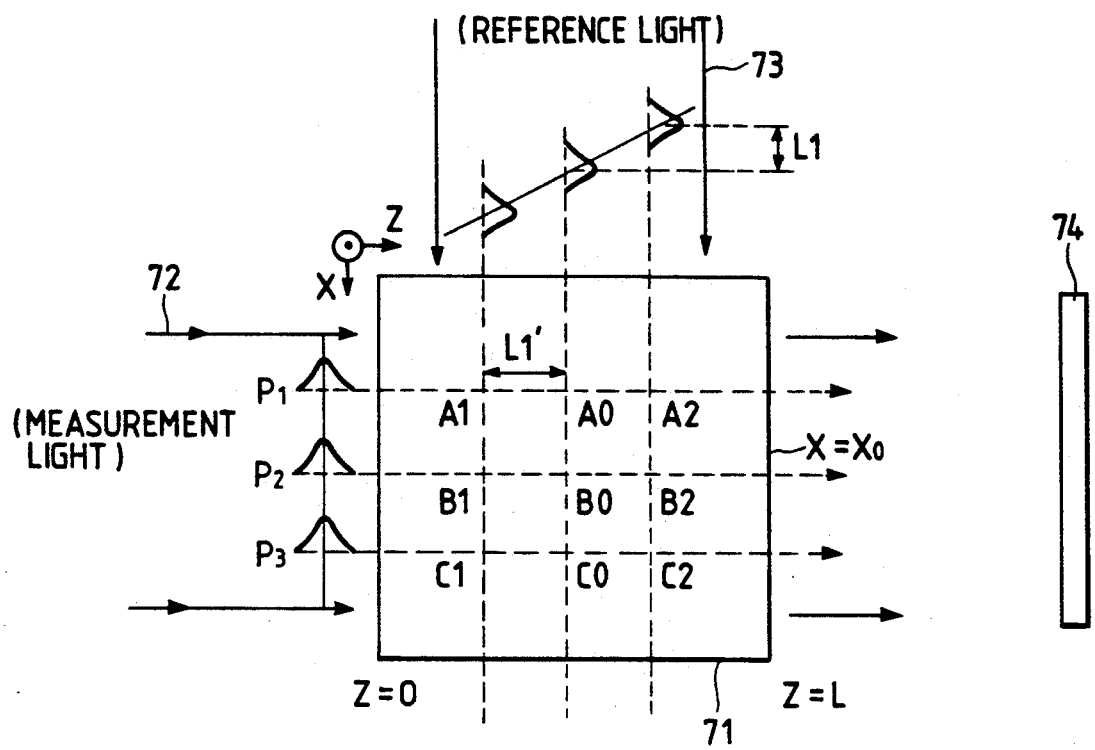
FIG. 7 is a schematic view of the principal part illustrating another principle of a method of measuring a light pulse width according to the present invention.

FIG. 7 is a schematic view of the principal part showing the principle of measuring the light pulse width in a form different from the previous description according to the present invention.

As compared with the principle shown in FIG. 1, the principle shown in FIG. 7 is to allow the measurement light 72 and reference light 73 to enter the two-photon absorption medium 71 at an angle for them to be rectangular, and then, the light pulse wave front of the reference light is inclined along the width of the light beam of the reference light as shown in FIG. 7. This is what differs from the previous one.

Figure 8:
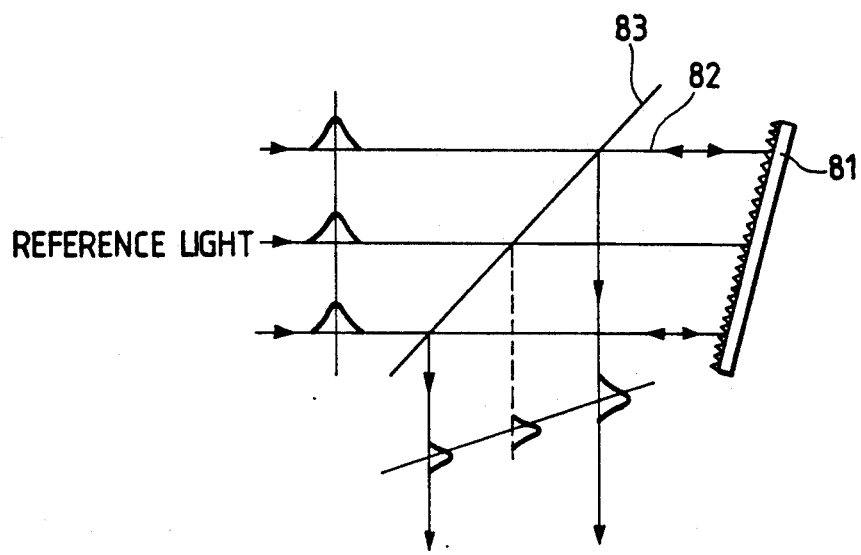
FIG. 8 is a schematic view of the principal part showing a method of inclining the wave front of a light beam according to a light pulse width measuring method of the present invention.

As a method of inclining the wave front of the pulse light as shown in FIG. 7, it may be possible to employ a blazed grating 81 for the reflection of the reference light beam 82 as shown in FIG. 8 for its implementation, for example. Now, hereunder, the reason why such an inclination is necessary for the wave front of the pulse light will be described in conjunction with FIG. 7.

The measurement light 72 and reference light 73 perpendicular to each other, which have entered the two-photon absorption medium 71, are propagated in the medium. At this juncture, at each of the points A0, B0, and C0 in FIG. 7, the superpositions of the reference light and measurement light represent respectively "the reference light is advancing", "no advancement and delay of the reference light and measurement are present", and "the measurement light is advancing".

However, if there is no inclination for the wave front of the reference light beam, the time difference with the measurement light which intersects the reference light, when passing the A1 and A2 on the same line as A0 at the same point (shown in the portion at P1) of the wave plane of the measurement light, is caused to differ from the time difference at A0. Likewise, the same results will follow at the point B0 and points B1 and B2 as well as the point C0 and points C1 and C2.

Therefore, in order to obtain the same time difference always at every point when each of the points of the measurement light beam in the horizontal direction intersects the reference light beam when it is propagated in the medium, it is necessary to incline the wave front of the reference light beam as shown in FIG. 7. The inclination at this time is established to set the difference in the air to be L1 so that L1 is equal to n·L1' (here n is the refractive index of the medium) for the difference L1' between A0 and A1 in the medium in FIG. 7.

Thus, the light pulse P1 of the measurement light beam encounters the light pulse of the reference light beam with a same time difference at each of the points A1, A0, and A2 (in this case, the reference light is advancing). Likewise the light pulse P2 of the measurement light beam encounters the light pulse of the reference light beam with a same time difference at each of the points B1, B0, and B2 (in this case, there is no time difference). Also, the light pulse P3 of the measurement light beam encounters the light pulse of the reference light beam with a same time difference at each of the points C1, C0, and C2 (in this case, the measurement light is advancing).

Subsequently, the description will be made of the state of the light pulse of the measurement light beam when it encounters thus the light pulse of the reference light beam at each point with a given time difference.

Now, given the luminous intensity of the measurement light from the medium at its exit plane z=L as $I_p$ (L ; t), and the luminous intensity of the reference light at a point x in the vertical direction as $I_r$ (x ; t+$\tau$) (here, $\tau$ is dependent on the position of the measurement light beam in the direction of the x axis, and c is the light velocity in the vacuum, it is expressed as $\tau = n(x - x_0)/c$) the two-photon absorption effect that the measurement light suffered when $I_p << I_r$ is expressed approximately as follows:

$$I_p(L;t) = I_{p0}(0;t)\exp[-(\alpha + \beta I_r(x;t+\tau))L] \qquad (5)$$
$$\simeq I_{p0}(0;t)[1 - \beta I_r(x;t+\tau)L]\exp(-\alpha L)$$

Where $I_{p0}$ is the luminous intensity of the measurement light beam at the incident plane of the aforesaid medium; $\alpha$ is the linear absorption coefficient of the medium; and $\beta$ is the two-photon absorption coefficient of the medium. The two-photon absorption effect is assumed to be small.

In this respect, $I_r(x ; t+\tau)$ in the above formula can be expressed as given below because it receives the linear absorption in the direction of the x axis and the attenuation of the two-photon absorption effect itself (it is assumed that the attenuation due to the two-photon absorption by the measurement light is negligible).

$$I_r(x;t+\tau) = \frac{I_r(0;t+\tau)\exp(-\alpha x)}{1 - \frac{\beta_{11}}{\alpha}I_r(0;t+\tau)[\exp(-\alpha x) - 1]} \qquad (6)$$
$$\simeq I_r(0;t+\tau)\exp(-\alpha x)[1 - \beta_{11}I_r(0;t+\tau)x]$$

Where $I_r(0; t+\tau)$ is the luminous intensity of the reference light at x=0; $\beta_{11}$ is the two-photon absorption coefficient of the reference light itself; and the approximation is the linear absorption, and the two-photon absorption is assumed to be small. When the expression (6) is assigned to the expression (5), it becomes as follows:

$$I_p(L;t) = I_{p0}(0;t)[1 - \beta(L+x)I_{r0}(o;t+\tau)\exp(-\alpha x)]\exp(-\alpha L) \qquad (7)$$

Where the term of $\beta\beta_{11}$ is small as compared with the term of $\beta$ and is neglected. Now, from the above formula it is known that the variation of the measurement light due to the two-photon absorption is a product of the intensity of the measurement light and the intensity of the reference light.

Further, although a measurement light beam such as this is detected optically a photo-line sensor, the result of the detection is the integral value of time because the response speed of this photodetector is much slower than the pulse width of the measurement light. Therefore, the spatial distribution of the measurement light beam detected by the photo-line sensor is expressed as follows:

$$G(\tau) \propto \beta(L+x)\exp[-\alpha(L+x)]\int_{-\infty}^{\infty} I_{F0}(0;t)I_r(0;t+\tau)dt \quad (8)$$

Where the time difference $\tau$ corresponds to the direction x on the line sensor and is represented as $x = x0 + c\tau/n$.

As a result, the spatial distribution observed on the plane of the photo-line sensor 74 due to the light absorption in the medium of the reference light beam is expressed as a product of the autocorrelation function ($\tau$ function) and the term ($\tau$ function) of the influence of the linear and nonlinear light absorptions.

Usually, the wavelength of the reference light and measurement light with respect to the medium having the two-photon absorption effect is a wavelength approximately two times the wavelength which suffers linear absorption. Accordingly, the linear absorption of such wavelength is extremely small (unless there is any absorption due to impurities and the like). In such a case, the influence of the linear absorption for the expression (8) can be ignored, and the formula can be written as follows:

$$G(\tau) \propto \beta(L+x)\int_{-\infty}^{\infty} I_{F0}(0;t)I_r(0;t+\tau)dt \quad (9)$$

In this case, the influence of the term (that is, $\tau$ dependence) of $\beta(L+x)$ before the autocorrelation function is corrected by the signal processing after the photodetection, or it can be eliminated by making the thickness L of the aforesaid medium 71 a wedge shape of $L = L0 + x0 - x = L0 - c\tau/n$ (L0 > x0) as shown in FIG. 9A or FIG. 9B.

In this respect, as a two-photon absorption medium to be used for the present invention, GaAs, CdTe, InP or other semiconductors or BaTiO$_3$, KNbO$_3$, SBN, KNSBN or other insulators can be used for obtaining the effect.

Now, the description will be made of a specific example of a light pulse width measuring apparatus in accordance with the aforesaid principle.

FIG. 10 is a view schematically showing the principal part of the embodiment 5 of a light pulse width measuring apparatus according to the present invention. The light pulse to be measured, which is emitted from a light source means 90, is converted into a sheet beam by a collimator 91 comprising a cylindrical lens system on the plane parallel to the plane of FIG. 10. Then, one of the beams which are divided by a beam splitter 92 is allowed to enter the two-photon absorption medium 96 as reference light through the beam splitter 93 as a light beam with its wave front being inclined by the beam splitter 93 and blazed grating 94 as described in conjunction with FIG. 8.

Also, the other beam is allowed to enter the aforesaid two-photon absorption medium 96 through a mirror 95 as measurement light perpendicularly to the aforesaid reference light. Here, in this case, it is necessary to make the luminous intensity of the measurement light sufficiently weaker than the luminous intensity of the reference light.

Subsequent to the interaction with the reference light in the medium 96 such as described in FIG. 7, the measurement light at the exit plane of the medium 96 is imaged through a lens 97 on a photosensor 98, and the autocorrelation function between the measurement light and reference light is detected on the photosensor 98 as a spatial distribution. In this way, the pulse width of the pulse of a single light to be measured from the light source means 90 is estimated by the autocorrelation function.

As an example, the temporal waveform of the light pulse to be measured is assumed to be of a Gaussian distribution, and given its full width at half maximum (FWHM) as $t_p$, where the FWHM of the autocorrelation function is $\Delta\tau$, it is given as follows in the same manner as the aforesaid expression (4):

$$t_p = \frac{\Delta\tau}{\sqrt{2}}$$

It is therefore possible to estimate the pulse width $t_p$ of a light to be measured from the $\Delta\tau$.

Here, in FIG. 10, there is of course no problem even if the wave front of the measurement light is inclined instead of the wave front of the reference light which is not inclined, or there is no problem even if the light beam of the reference light being transmitted from the medium 96 is detected by the lens 97 and photosensor 98 as a matter of course. In this case, however, the luminous intensity of the reference light must be made sufficiently weaker than the luminous intensity of the measurement light on the contrary to the above-mentioned embodiment. Then, in this case, the configuration arrangement of the aforesaid medium 71 shown in FIG. 9 must be rotated 90 degrees for its use.

As set forth above, using a medium having a two-photon absorption effect, the autocorrelation function of the light pulse of a light to be measured passing the medium is obtained sequentially, or the autocorrelation function of the light pulse of a light to be measured is obtained at a time after converting it into a spatial distribution. Thus, it is possible to attain the provision of a light pulse width measuring apparatus capable of performing a high precision measurement of light pulse width without any high precision phase matching of the light beam and a method of measuring light pulse width using such apparatus.

What is claimed is:

1. A method of measuring a pulse width of a light pulse, comprising the steps of:
    incidence of a first light and a second light on a medium having a two-photon absorption effect, said first light and second light being light pulse;
    detection of at least said first light of said first and second lights passing through said medium; and
    measurement of the pulse width of said first light or said second light of the base of the result of said detection.

2. A method according to claim 1, wherein said detection is performed by detecting a luminous intensity of said first light by a photodetector.

3. A method according o claim 2, wherein said measurement of the pulse width is performed on the basis of a relationship between a time difference in the incidence of said first and second lights to said medium and the detected luminous intensity of said first light.

4. A method according to claim 3, wherein said measurement of the pulse width is performed by obtaining said relationship by establishing the time difference n the incidence of said first light and second light on said medium temporally or spatially.

5. A method according to claim 1, wherein either one of GaAs, CdTe, InP, BaTiO$_3$, KNbO$_3$, and SBN is used for said medium.

6. A method according to claim 1, wherein said incidence is performed by causing said first light and second light to enter the medium not in parallel.

7. A method according to claim 1, wherein said incidence is performed by causing said first light and second light to enter the medium on a same light path.

8. A method according to claim 1, wherein said incidence is performed by causing said first light and second light to enter the medium in a perpendicular direction thereof.

9. A method according to claim 1, wherein said first and second lights are formed by separating a light pulse emitted from a single light source.

10. A method according to claim 1, wherein said first light is established with its luminous intensity being weaker than said second light.

11. An apparatus for measuring a pulse width of a light pulse from a light source, comprising:
a medium having a two-photon absorption effect;
a beam splitter for separating the light pulse from said light source into a measurement light and a reference light;
an optical system for guiding said measurement light and said reference light to said medium, said optical system having a member for changing an incident time difference to said medium between said measurement light and said reference light temporally or spatially;
a photodetector for detecting a luminous intensity of at least the measurement light of said measurement and reference lights passing through said medium; and
a signal processing system for receiving a detection output from said photodetector, said photodetector performing said pulse width measurement on the basis of a relationship between the time difference in the incidence of said reference light and said measurement light to said medium and the luminous intensity detected by said photodetector.

12. An apparatus according to claim 11, wherein a material of said medium is either one of GaAs, CdTe, InP, BaTiO$_3$, KNbO$_3$, and SBN.

13. An apparatus according to claim 11, wherein said optical system allows said reference light and said measurement light to enter the medium not in parallel.

14. An apparatus according to claim 11, wherein said optical system allows said reference light and said measurement light to enter the medium on a same light path.

15. An apparatus according to claim 11, wherein said optical system allows said reference light and said measurement light to enter the medium in the rectangular directions.

16. An apparatus according to claim 11, wherein said optical system is arranged so that said measurement light has a weaker luminous intensity than said reference light.

17. An apparatus according to claim 11, wherein there is further provided an optical member for causing polarization directions of said measurement light and said reference light to differ from each other.

18. An apparatus for measuring a pulse width of a light pulse from a light source, comprising:
a medium having a two-photon absorption effect;
an optical system for guiding a first light and a second light to said optical system, said first light and second light being light pulse;
photodetection means for detecting at least the first light of the first and second lights passing through said medium; and
arithmetic means for performing a measurement of the pulse width of the first light or the second light on the basis of the result of the detection of said photodetection means.

19. An apparatus according o claim 18, wherein said optical means has time difference changing means for changing an incident time difference to said medium between said firs light and said second light temporarily or spatially, and said arithmetic means performs the pulse width measurement on the basis of a relationship between the time difference in the incidence of said first light and second light to said medium and the luminous intensity detected by said photodetection means.

20. An apparatus according to claim 18, wherein the material of said medium is either one of GaAs, CdTe, InP, BaTiO$_3$, KnBO$_3$, and SBN.

* * * * *

UNITED STATES PATENT AND TRADEMARK OFFICE
CERTIFICATE OF CORRECTION

PATENT NO. : 5,299,170
DATED : March 29, 1994
INVENTOR(S) : MASAAKI SHIBATA ET AL.

It is certified that error appears in the above-identified patent and that said Letters Patent is hereby corrected as shown below:

AT [57] ABSTRACT

Line 3, "pulse," should read --pulses,--.

AT [30] FOREIGN APPLICATION PRIORITY DATA

"July 19, 1991 [JP] Japan ...... 3-204942" and
"Jan. 24, 1992 [JP] Japan ...... 4-034424"
should be deleted.

COLUMN 1

Line 46, "product" should read --produce--.

COLUMN 2

Line 25, "convention" shoud read --conventional--.

COLUMN 5

Form 2, "r,o;t-$^{\tau)]z}$" should read --r,o;t-$\tau$)]z--.

COLUMN 6

Line 35, "fluence" should read --energy--.

COLUMN 7

Line 63, "passes" should read --passed--.

UNITED STATES PATENT AND TRADEMARK OFFICE
CERTIFICATE OF CORRECTION

PATENT NO. : 5,299,170

DATED : March 29, 1994

INVENTOR(S) : MASAAKI SHIBATA ET AL.

It is certified that error appears in the above-identified patent and that said Letters Patent is hereby corrected as shown below:

COLUMN 9

Line 11, "a" should read --an--.
    Line 65, "its" should read --their--.

COLUMN 13

Line 4, "optically a" should read --optically by a--.

COLUMN 14

Line 60, "pulse;" should read --pulses;--.
    Line 64, "of the base" should read --on the basis--.

COLUMN 15

Line 1, "o" should read --to--.
    Line 8, "n" should read --in--.
    Line 11, "either" should read --any--.

UNITED STATES PATENT AND TRADEMARK OFFICE
CERTIFICATE OF CORRECTION

PATENT NO. : 5,299,170
DATED : March 29, 1994
INVENTOR(S) : MASAAKI SHIBATA ET AL.    Page 3 of 3

It is certified that error appears in the above-identified patent and that said Letters Patent is hereby corrected as shown below:

<u>COLUMN 16</u>

```
Line 4,  "either" should read --any--.
Line 29, "pulse;" should read --pulses;--.
Line 37, "o" should read --to--.
Line 41, "firs" should read --first-- and
         "temporarily" should read --temporally--.
Line 49, "KnBO₃," should read --KNbO₃,--.
```

Signed and Sealed this

Fifteenth Day of November, 1994

BRUCE LEHMAN

Attest:

Attesting Officer    Commissioner of Patents and Trademarks